United States Patent
Künzel

(10) Patent No.: US 10,972,034 B2
(45) Date of Patent: Apr. 6, 2021

(54) COMPENSATION OF DETENT TORQUES OF SYNCHRONOUS MOTORS

(71) Applicant: Siemens Aktiengesellschaft, Munich (DE)

(72) Inventor: Stefan Künzel, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/702,022

(22) Filed: Dec. 3, 2019

(65) Prior Publication Data

US 2020/0177119 A1  Jun. 4, 2020

(30) Foreign Application Priority Data

Dec. 4, 2018 (EP) .................................. 18210093

(51) Int. Cl.
*H02P 23/00* (2016.01)

(52) U.S. Cl.
CPC ................ *H02P 23/0022* (2013.01)

(58) Field of Classification Search
CPC .... H02P 23/0022; H02P 25/064; H02P 21/20; H02P 6/10
See application file for complete search history.

(56) References Cited

U.S. PATENT DOCUMENTS

| 6,505,132 | B1 * | 1/2003 | Takaku | G01L 3/00 |
| | | | | 318/431 |
| 7,385,328 | B2 * | 6/2008 | Melfi | H02K 1/278 |
| | | | | 310/156.45 |
| 8,541,968 | B2 * | 9/2013 | Kyllingstad | H02P 6/10 |
| | | | | 318/400.23 |
| 2003/0181999 | A1 | 9/2003 | Spindler | |
| 2010/0102767 | A1 * | 4/2010 | Endo | B60W 10/10 |
| | | | | 318/453 |
| 2010/0156332 | A1 | 6/2010 | Lin | |
| 2011/0084636 | A1 | 4/2011 | Kyllingstad | |
| 2013/0221887 | A1 | 8/2013 | Aghili | |
| 2017/0302201 | A1 * | 10/2017 | Saito | H02P 6/10 |

FOREIGN PATENT DOCUMENTS

JP  2010063343 A  3/2010

* cited by examiner

*Primary Examiner* — Rina I Duda
(74) *Attorney, Agent, or Firm* — Henry M. Feiereisen LLC

(57) ABSTRACT

In a method and a compensation arrangement for compensating detent torques of identically constructed synchronous motors, a no-load detent torque and a bad detent torque are measured on a reference motor as a function of a rotor position relative to a stator. A differential detent torque for the reference motor is determined by subtracting the measured no-load detent torque from each measured bad detent torque, and an operating-point-dependent spectral component of the differential detent torque is determined, A model function modeling the spectral component as a function of the operating point is then formed, and a first compensation current, which generates a compensation torque that compensates a detent torque at the instantaneous operating point with a value of the model function, is superimposed for each of the identically constructed synchronous motors on a setpoint current when operating at an instantaneous operating point in a predetermined first operating range.

12 Claims, 4 Drawing Sheets

US 10,972,034 B2

COMPENSATION OF DETENT TORQUES OF SYNCHRONOUS MOTORS

CROSS-REFERENCES TO RELATED APPLICATIONS

This application claims the priority of European Patent Application, Serial No: 18210093.3, filed on Dec. 4, 2018, pursuant to 35 U.S.C. 119(a) (d), the content of which is incorporated herein by reference in its entirety as if fully set forth herein.

BACKGROUND OF THE INVENTION

The present invention relates to a method and a compensation arrangement for compensating detent torques of synchronous motors.

The following discussion of related art is provided to assist the reader in understanding the advantages of the invention, and is not to be construed as an admission that this related art is prior art to this invention.

A synchronous motor usually has detent torques, which interfere with the smooth running of the motor and, like interference variables, affect the regulation of operating parameters of the motor such as a rotational speed or position of the rotor or a rotating motor or a velocity or position of the rotor of a linear motor. The detent torques of synchronous motors normally depend upon manufacturing tolerances, for example manufacturing tolerances which influence the formation of the air gap between the rotors and stators of the motors. Owing to manufacturing tolerances of this kind, the detent torques of identically constructed synchronous motors generally differ from one another. As a general rule, the detent torques are furthermore load-dependent and increase, for example, along with an increasing load torque of a motor. This manufacturing and load-dependency of the detent torques complicates the compensation of the detent torques during operation of synchronous motors.

It would therefore be desirable and advantageous to obviate prior art shortcomings and to provide an improved method and an improved compensation arrangement for compensating detent torques of synchronous motors.

SUMMARY OF THE INVENTION

According to one aspect of the present invention, a method for compensating detent torques of identically constructed synchronous motors, which each have a stator and a rotor, includes measuring on a reference motor of the identically constructed synchronous motors a no-load detent torque during no-load operation as a function of a rotor position of the rotor relative to the stator; measuring for various operating points of the reference motor a load detent torque as a function of the rotor position relative to the stator; subtracting for each measured load detent torque from the measured load detent torque the measured no-load detent torque to determine a differential detent torque for the reference motor; determining an operating-point-dependent spectral component of the differential detent torque; forming a model function of the spectral component, the model function modeling the spectral component as a function of the operating point; and superimposing for each synchronous motor of the identically constructed synchronous motors, while the synchronous motor is operating at an instantaneous operating point in a predetermined first operating range, on a setpoint current of the synchronous motor a first compensation current, which generates a compensation torque that compensates a detent torque at the instantaneous operating point with a value of the model function.

The invention is based on the Idea of compensating a detent torque portion, which is substantially identical for identically constructed synchronous motors, Le, for synchronous motors of a particular motor type, regardless of an sample-dependent detent torque portion of the detent torque of a synchronous motor. In this context, on the one hand use is made of the knowledge that the sample-dependent detent torque portion, for the most part, already appears during the no-load operation of the synchronous motor and can be measured as no-load detent torque. Furthermore, use is made of the experience that the sample-independent detent torque portion is generally concentrated at a single spectral component or at only a few spectral components of a spectrum of the detent torque.

According to the invention, a load detent torque, i.e. a detent torque of the loaded reference motor, is hence measured for one of the synchronous motors, referred to here as a reference motor, at various operating points and the likewise measured no-load detent torque of the reference motor is subtracted therefrom. The differential detent torques determined for the various operating points by subtracting the no-load detent torque from the load detent torques are largely sample-independent. Furthermore, according to the invention, a load-dependent spectral component of the differential detent torque is determined and then compensated in the same way for all synchronous motors of the particular motor type, According to the invention, the spectral component is compensated through modeling with a model function as a function of the operating point, in order to extend the values of the spectral component determined for individual operating points to all operating points. The value of the model function at an instantaneous operating point is then compensated by a compensation current, which generates a compensation torque, which is equal and opposite to the value of the model function.

When the spectrum of the differential detent torque has several load-dependent spectral components, which contribute significantly to the detent torque, then each of these spectral components is accordingly modeled by a respective model function and compensated by a compensation current.

The fact that the a spectral component is only compensated in a particular operating range, takes into consideration that a synchronous motor generates voltage harmonics, which affect the current regulation as interference variables and which prevent, as the rotor rotational speed or rotor velocity increases, the amplitude and phase of the current from being set correctly. In addition, detent torques generally have a less critical impact on the operation of a synchronous motor at high rotor rotational speeds or rotor velocities than at low rotor rotational speeds or rotor velocities due to the inertia of the rotor, meaning that a compensation of the detent torques becomes less useful at the rotor rotational speeds or rotor velocities rise. The first operating range, in which a spectral component of the differential detent torque is compensated, is therefore preferably defined for rotating synchronous motors by a rotational speed interval for rotor rotational speeds and for linear synchronous motors by a velocity interval for rotor velocities.

The invention thus enables compensation of load-dependent portions of the detent torque, which is uniform and sample-independent for a motor type, thus requiring an elaborate determination of load-dependent detent torques only for a reference motor of the motor type. The invention thereby reduces quite considerably the complexity and costs associated with compensating load-dependent detent torques compared to a compensation, where the load-dependent detent torques are measured and compensated separately for each synchronous motor of the particular motor type.

According to another advantageous feature of the present invention, an operating point of a synchronous motor can be defined by an actual value of a load torque, or by an actual value of a load torque and at least one additional parameter, taking into consideration that the operating-point-dependent detent torque portions of a synchronous motor primarily depend on the load torque, wherein the load torque for a rotating synchronous motor is understood as a torque to be applied under load and for a linear motor as a force to be applied under load. Only in special circumstances do have other parameters also a relevant influence on the detent torques. One such parameter may, for example, be the temperature, when the synchronous motor is operated at highly fluctuating temperatures.

According to another advantageous feature of the present invention, the model function may model an amplitude of the spectral component with a polynomial function of a load torque, and/or the model function may model a phase of the spectral component with a piecewise linear function of a load torque, taking into consideration that the amplitude and phase of a spectral component of the differential detent torque frequently depend in particular for high load torques, in a dose approximation, upon the load torque in polynomial form (in the case of the amplitude) or linear form (in the case of the phase), wherein the linear dependency of the phase upon the load torque may differ for positive and negative values of the load torque. Although the amplitude and/or or phase may differ from the polynomial or linear relationship for low magnitudes of the load torque, such deviations of the model function from the actual course of the amplitude and/or phase are generally acceptable, since the differential detent torque is quite small for low magnitudes of the load torque.

According to another advantageous feature of the present invention, a no-load detent torque may be measured for each synchronous motor in a no-load operation as a function of the rotor position and, during operation of the synchronous motor in a predeterminable second operating range, a second compensation current, which generates a compensation torque that compensates the no-load detent torque of the synchronous motor may be superimposed on the setpoint current of the synchronous motor. Like the first operating range, the second operating range is also preferably defined for rotating synchronous motors by a rotational speed interval for rotor rotational speeds and for linear synchronous motors by a velocity interval for rotor velocities. For example, the second operating range may contain the first operating range.

According to another advantageous feature of the present invention, a no-load detent torque can be separately measured and compensated for each synchronous motor of the particular motor type, taking into consideration that the no-load detent torques of identically constructed synchronous motors generally differ from one another due to manufacturing tolerances and therefore cannot be compensated in an sample-independent manner. However, measuring the no-load detent torque of a synchronous motor is significantly less complex than measuring load-dependent load detent torques for various operating points, and in particular does not require a test setup. According to the invention, an sample-dependent compensation of the no-load detent torque of the synchronous motors of a particular motor type is performed, whereas an sample-independent compensation of load-dependent portions of the detent torque is performed.

A spectral component of the differential detent torque, for example, for rotating synchronous motors is a Fourier component of the differential detent torque as a function of a rotor angle of a rotation of the rotor relative to the stator and for linear synchronous motors a Fourier component of the differential detent torque as a function of a rotor position of the rotor relative to the stator.

According to another advantageous feature of the present invention, with every compensation of a detent torque of a synchronous motor, i.e. both with the compensation of a spectral component of the differential detent torque and with the compensation of the no-load detent torque, a dead time in the control of the synchronous motor may be considered, which elapses between the time the respective compensation current is changed and the compensation torque changes due to the change of the compensation current. In this context, a respective compensation current is generated for compensating a detent torque, which becomes effective at a point in time shifted by the dead time after the generation of the compensation current. In this way, the finite control time in the control of a synchronous motor is advantageously taken into consideration when compensating the detent torque.

According to another aspect of the present invention, a compensation arrangement for compensating detent torques of identically constructed synchronous motors, which each have a stator and a rotor, includes a measuring device configured to acquire a no-load detent torque and a load detent torque of a reference motor as a function of a rotor position of the rotor relative to the stator. The compensation arrangement further includes an evaluation unit configured to subtract, for each measured load detent torque, from the measured load detent torque the measured no-load detent torque to determine a differential detent torque for the reference motor, to determine an operating-point-dependent spectral component of the differential detent torque, and to form a model function of the spectral component, wherein the model function models the spectral component as a function of the operating point. The compensation arrangement also includes a control unit configured to control a motor current of a synchronous motor and to superimpose, during operation of the synchronous motor at an instantaneous operating point in a first operating range, on a setpoint current of the synchronous motor a first compensation current, which generates a compensation torque that compensates a detent torque at the instantaneous operating point with a value of the model function.

A compensation arrangement according to the present invention can advantageously carry out the method according to the invention. The advantages of a compensation arrangement according to the invention therefore correspond to the advantages of the method according to the invention.

According to another advantageous feature of the present invention, the control unit of each synchronous motor may be constructed to store a no-load detent torque acquired for the synchronous motor as a function of its rotor position and to superimpose, during operation of the synchronous motor in a predeterminable second operating range, on the setpoint current of the synchronous motor a second compensation current, which generates a compensation torque that compensates the no-load detent torque of the synchronous motor. This enables the aforementioned advantageous sample-dependent compensation of the no-load detent torque separately for each synchronous motor of the particular motor type.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
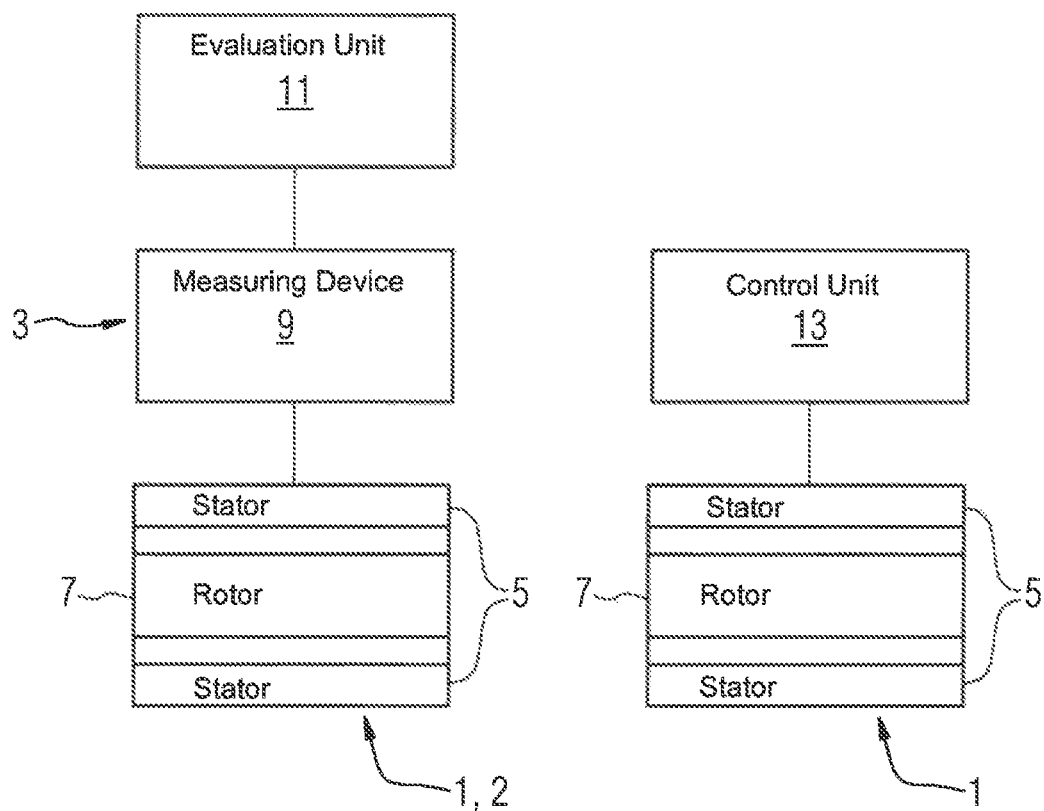
FIG. 1 shows schematically electric synchronous motors and a compensation arrangement for the compensation of detent torques of the synchronous motors.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom ones, diagramrnatic representations and fragmentary views. In certain instances, details which are not necessary for an understanding of the present invention or which render other details difficult to perceive may have been omitted.

Turning now to the drawing, and in particular to FIG. 1, there are shown two identically constructed synchronous motors 1 and a compensation arrangement 3 for the compensation of detent torques of the synchronous motors 1.

The synchronous motors 1 are each constructed as a permanently excited rotating electric machine or as a permanently excited linear motor with a stator 5 and a rotor 7 which is movable relative to the stator 5. For example, the rotor 7 may have permanent magnets and the stator 5 may have a laminated core with slots, through which a stator winding is routed. Alternatively, the stator 5 may have permanent magnets and the rotor 7 may have a laminated core with slots, through which a rotor winding is routed.

The compensation arrangement 3 has a measuring device 9, an evaluation unit 11 and for each synchronous motor 1 a control unit 13.

The measuring device 9 is used to measure for a reference motor 2 of the synchronous motors 1 a no-load detent torque during no-load operation as a function of a rotor position of the rotor 7 relative to the stator 5 and to measure, at various operating points, a respective load detent torque as a function of the rotor position.

In this context, an operating point of a synchronous motor 1 is defined by an actual value of a load torque $M_{load}$ of the synchronous motor 1. Alternatively, an operating point of a synchronous motor 1 may be defined by an actual value of the load torque $M_{load}$ and at least one additional parameter, for example a temperature.

The evaluation unit 11 determines, for each measured load detent torque of the reference motor 2, a differential detent torque by subtracting from the load detent torque the measured no-load detent torque of the reference motor 2. Furthermore, the evaluation unit 11 determines an operating-point-dependent spectral component of the differential detent torque and forms a model function of the spectral component, which models the spectral component as a function of the operating point.

The spectral component of the differential detent torque is, for rotating synchronous motors 1, a Fourier component of the differential detent torque as a function of a rotor angle of a rotation of the rotor 7 relative to the stator 5 and, for linear synchronous motors 1, a Fourier component of the differential detent torque as a function of a rotor position of the rotor 7 relative to the stator 5.

If an operating point is defined by an actual value of the load torque $M_{load}$ and the synchronous motors 1 are rotating electric machines, then an exemplary model function $M_{detent}(M_{load})$ for a spectral component of the differential detent torque as a function of the load torque $M_{load}$ is formed as follows:

$$M_{detent}(M_{load}) = \text{amp}(M_{load}) \cdot \sin(n_1 \cdot \varphi + \text{phase}(M_{load})),$$

wherein $\varphi$ is the rotor angle, $\text{amp}(M_{load})$ model s an amplitude $A_{diff}$ of the spectral component of the differential detent torque as a function of the load torque $M_{load}$, $\text{phase}(M_{load})$ models a phase $P_{diff}$ of the spectral component of the differential detent torque as a function of the load torque $M_{load}$ and $n_1$ is a multiplicity characterizing the spectral component. $\text{amp}(M_{load})$ is, for example, a polynomial function, e.g. a quadratic function in accordance with $$\text{amp}(M_{load}) = k_1 \cdot M_{load}^2 + k_0 \cdot |M_{load}|,$$

wherein $k_1$ and $k_0$ are suitable constants to be specified. $\text{phase}(M_{load})$ is, for example, a piecewise linear function, see FIG. 6 for this purpose.

Instead of forming the model function as a function of the load torque $M_{load}$, as described above, the model function may also be formed as a function of a torque-generating current of the synchronous motor 1, since a unique dependency exists between the torque-generating current and the load torque $M_{load}$, which is frequently approximately linear.

If the synchronous motors 1 are linear motors, then a model function $M_{detent}(M_{load})$ is formed accordingly for a spectral component of the differential detent torque, wherein instead of the rotor angle $\varphi$ a position variable is used which indicates the position of the rotor 7 relative to the stator 5, and a wave number characterizing the spectral component is used instead of the multiplicity $n_1$.

A control unit 13 is used to control a motor current of a synchronous motor 1, In particular, each control unit 13 is configured to superimpose, during operation of the synchronous motor 1 at an instantaneous operating point in a predeterminable first operating range, on a setpoint current of the synchronous motor 1 a first compensation current, which generates a compensation torque which compensates at the instantaneous operating point a detent torque with the value of the model function.

Furthermore, the control unit 13 superimposes, during operation of the respective synchronous motor 1 in a predeterminable second operating range, on the setpoint current of the synchronous motor 1 a second compensation current, which generates a compensation torque which compensates the no-load detent torque of the synchronous motor 1. To this end, the no-load detent torque of the synchronous motor 1 is measured as a function of the rotor position during no-load operation, and the acquired no-load detent torque is stored by the control unit 13.

An operating range is defined for a rotating synchronous motor 1 by a rotational speed interval of rotor rotational speeds v and for linear synchronous motors 1 by a velocity interval for rotor velocities. For rotating synchronous motors 1, the first operating range is for example a first rotational speed interval having as a lower interval limit a rotational speed of zero and as an upper interval limit a predeterminable first rotational speed threshold value $v_S$, and the second operating range is for example a second rotational speed interval having as a lower interval limit a rotational speed of zero and as an upper interval limit a predeterminable second rotational speed threshold value. Likewise, for linear synchronous motors 1, the first operating range is for example a first velocity interval having as a lower interval limit a velocity of zero and as an upper interval limit a predeterminable first velocity threshold value, and the second operating range is for example a second velocity interval having as a lower interval limit a velocity of zero and as an upper interval limit a predeterminable second velocity threshold value.

Both when compensating a spectral component of the differential detent torque and when compensating the no-load detent torque of a synchronous motor 1, a dead time for controlling the synchronous motor 1 is taken into account, which is the elapsed time when the compensation current is changed and when the compensation torque changes due to the change of the compensation current. For this purpose, a respective compensation current for compensating the detent torque is generated that becomes effective at a point in time shifted by the dead time after the generation of the compensation current. For example, for compensating a detent torque of a rotating synchronous motor 1, by taking into consideration the instantaneous rotor rotational speed v, an instantaneous rotor angle φ is extrapolated to a value which the rotor angle φ assumes at a point in time shifted by the dead time. Likewise, for a linear motor 1, by taking into consideration the instantaneous rotor velocity, an instantaneous rotor position is extrapolated to a value which the rotor position assumes at a point in time shifted by the dead time.

Figure 2:
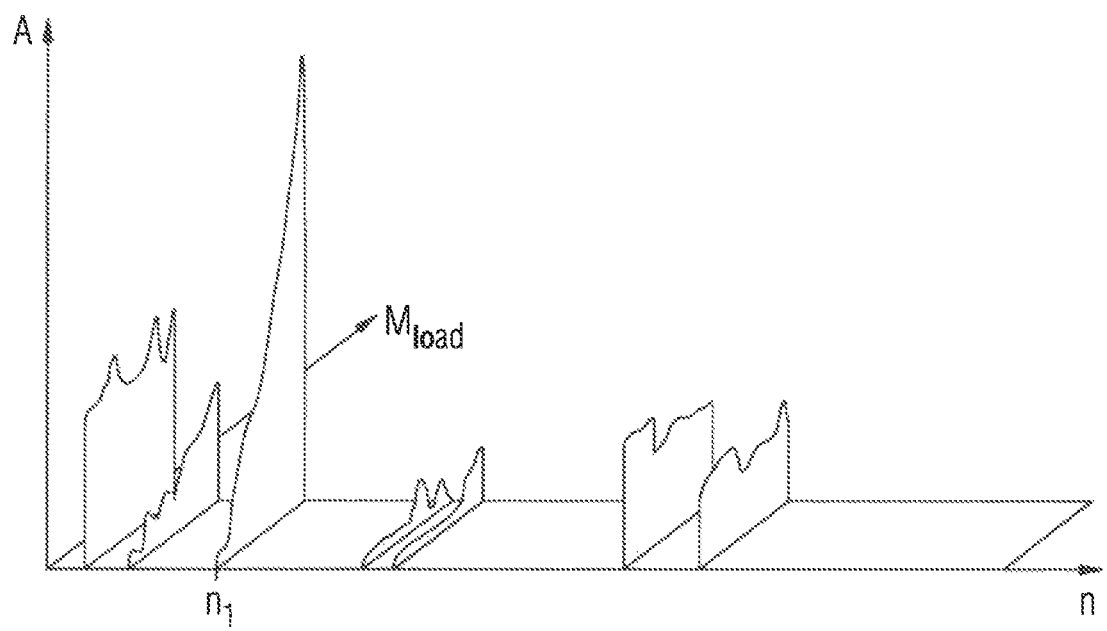
FIG. 2 shows amplitudes of spectral components of a detent torque of a synchronous motor as a function of a load torque.

FIG. 2 shows, by way of example, amplitudes A of spectral components, characterized in each case by a multiplicity n of an acquired load detent torque of a rotating synchronous motor 1 as a function of the load torque $M_{load}$. FIG. 2 shows a typical situation where load-dependent detent torque portions are concentrated at a spectral component with a specific multiplicity $n_1$, while the other spectral components depend to a lesser degree on the load torque $M_{load}$ or the operating point of the reference motor 2 and/or have considerably smaller load-dependent detent torque portions. According to the invention, in such a case the corresponding spectral component of the differential detent torque (namely those with the multiplicity $n_1$) are only determined and compensated for the spectral component with the multiplicity $n_1$. Frequently, the spectral component with the multiplicity $n_1=6p$ of six times the number of pole pairs p of the synchronous motor 1 dominates the load dependency of the detent torque. If the spectrum of the detent torque has a plurality of relevant load-dependent spectral components, then the corresponding spectral component of the differential detent torque is determined, modeled and compensated for each of these spectral components.

Figure 3:
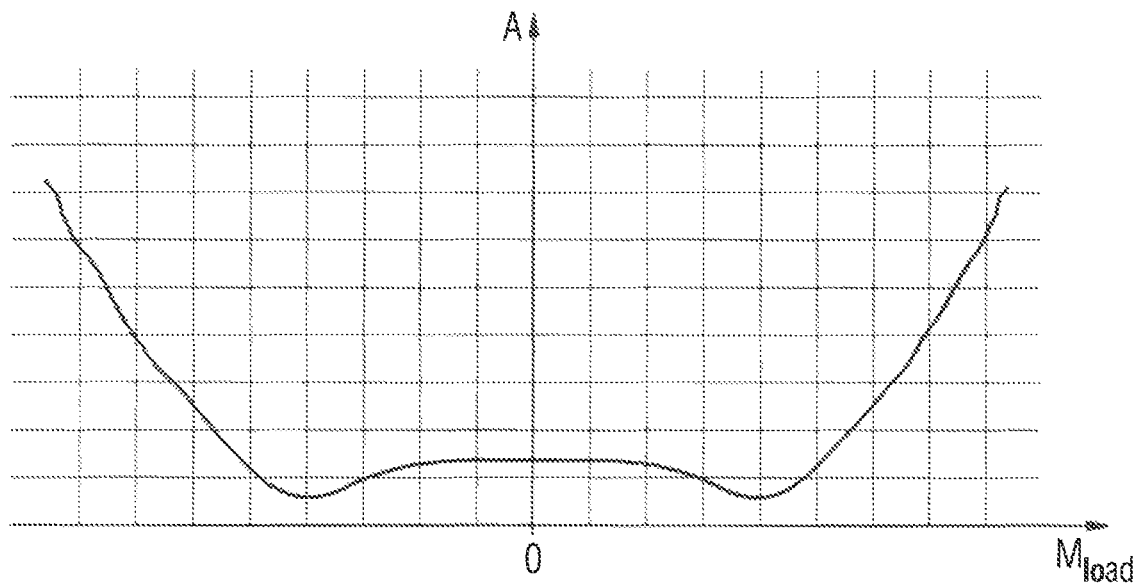
FIG. 3 shows an amplitude of a spectral component of a detent torque of a synchronous motor as a function of a load torque.
Figure 4:
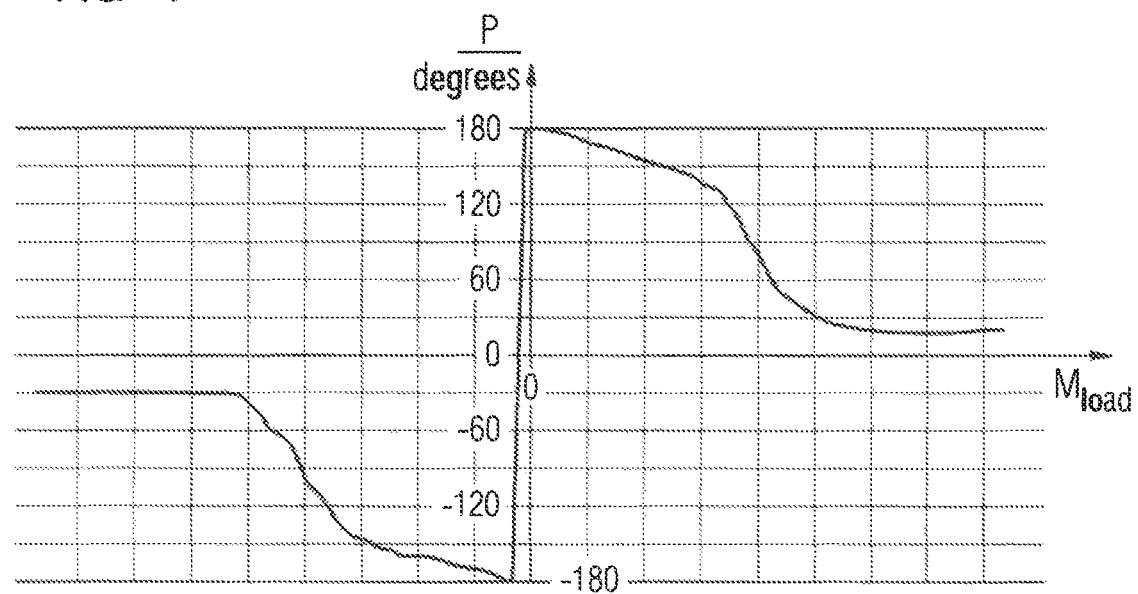
FIG. 4 shows a phase of a spectral component of a detent torque of a synchronous motor as a function of a load torque.

FIGS. 3 and 4 show the amplitude A and the phase P of a load-dependent spectral component of a detent torque of a synchronous motor 1 as a function of the load torque $M_{load}$.

Figure 5:
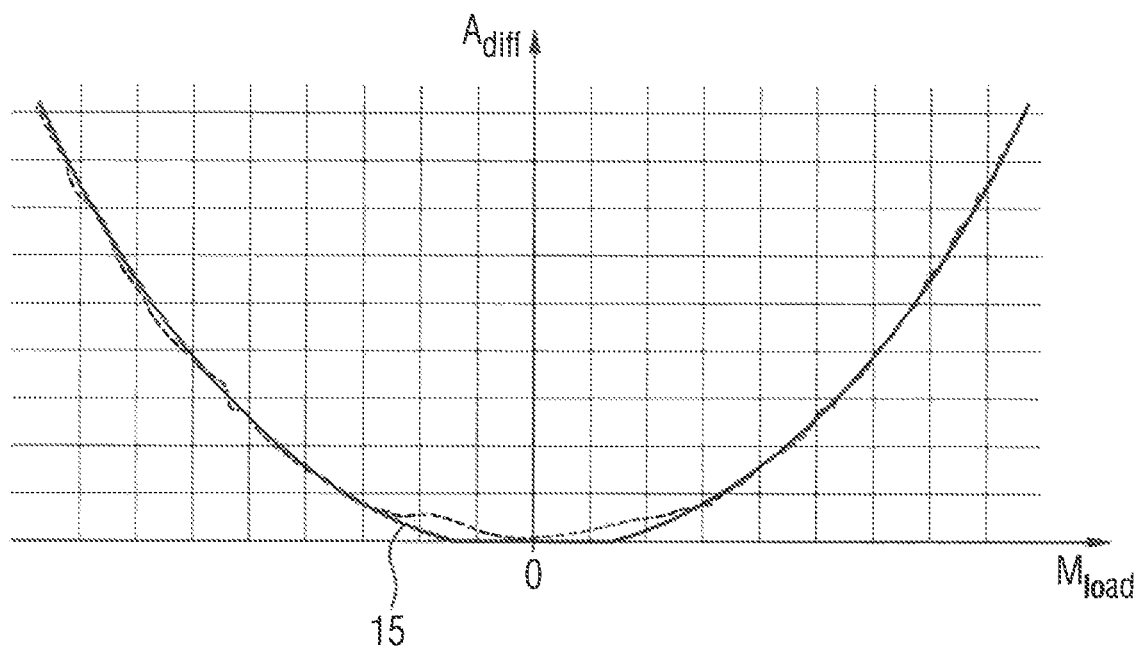
FIG. 5 shows an amplitude of a spectral component of a differential detent torque of a synchronous motor as a function of a load torque.
Figure 6:
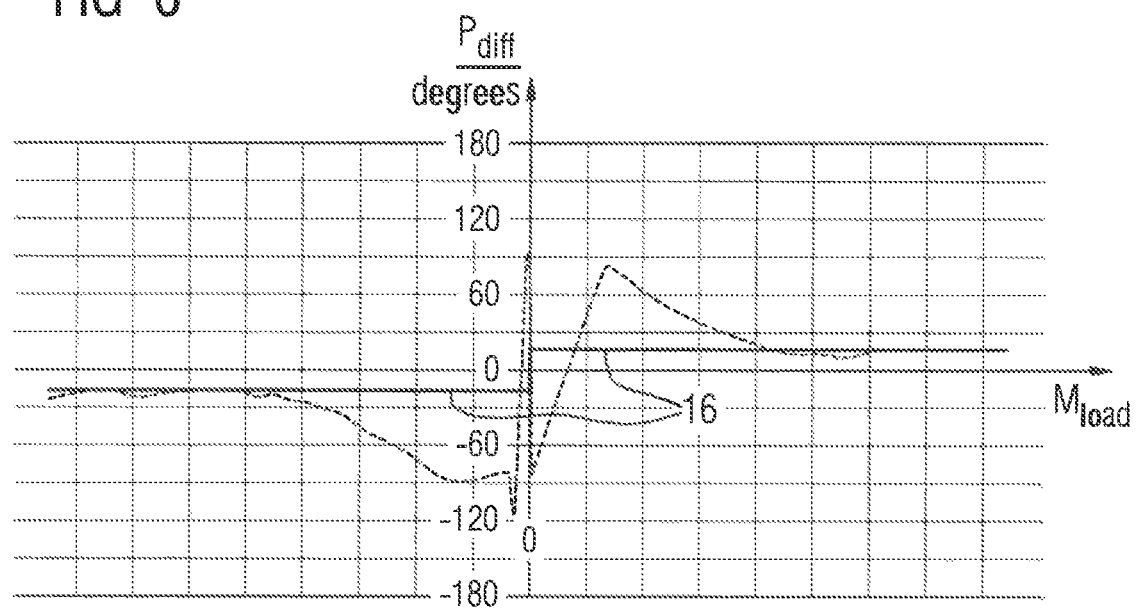
FIG. 6 shows a phase of a spectral component of a differential detent torque of a synchronous motor as a function of a load torque.

FIGS. 5 and 6 show the amplitude $A_{diff}$ and the phase $P_{diff}$ of the spectral component of the differential detent torque, which corresponds to the spectral component having the amplitude A and phase P shown in FIGS. 3 and 4, in each case as a function of the load torque $M_{load}$. FIG. 5 further shows the graph 15 of a quadratic function $amp(M_{load})$, which models the amplitude $A_{diff}$, and FIG. 6 shows the graph 16 of a piecewise linear function $phase(M_{load})$ of which models the phase $P_{diff}$. In the example shown in FIG. 6, the function $phase(M_{load})$ is constant for both positive and negative values of the load torque $M_{load}$ wherein the values of the constants for positive and negative values of the load torque $M_{load}$ differ from one another and correspond to the respective value of the phase $P_{diff}$ of the spectral component of the differential detent torque for large magnitudes of the load torque $M_{load}$. Although the function $phase(M_{load})$ thus deviates from the actual value of the phase $P_{diff}$ for small magnitudes of the load torque $M_{load}$, this deviation is generally acceptable, since the differential detent torque is small for small magnitudes of the load torque $M_{load}$. If, for large magnitudes of the bad torque $M_{load}$, the phase $P_{diff}$ is not a constant function, but rather is in each case approximately a linear function with a non-vanishing gradient for, for example, positive and negative values of the bad torque $M_{load}$, then the function $phase(M_{load})$ is defined, for example, for positive and negative values of the load torque by the respective linear function $M_{load}$.

Figure 7:
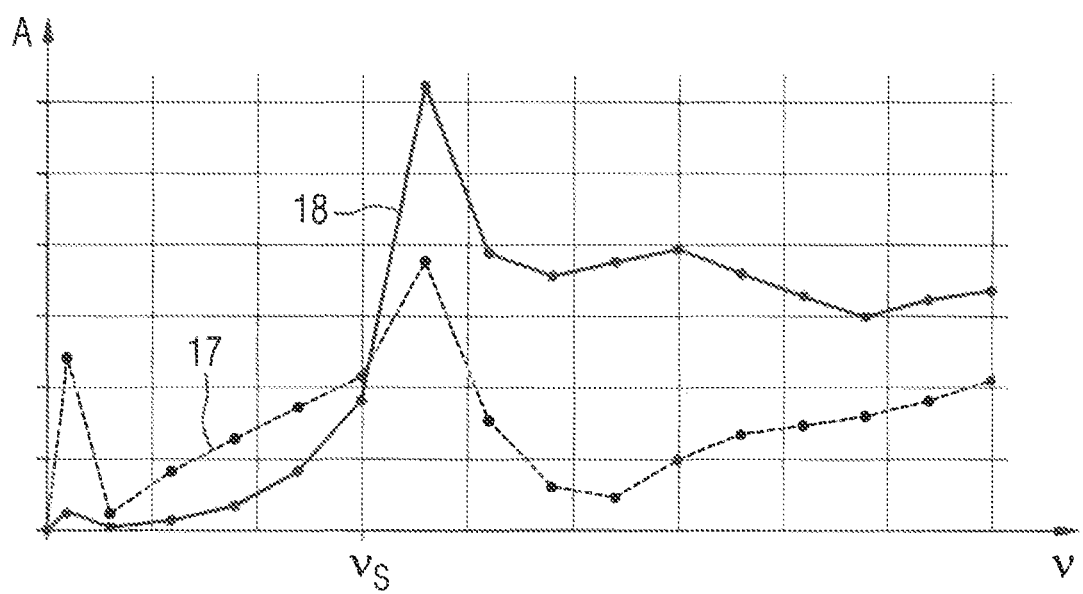
FIG. 7 shows amplitudes of a spectral component of a detent torque of a synchronous motor as a function of a rotational speed of the synchronous motor.

FIG. 7 shows amplitudes A of a load-dependent spectral component of a detent torque of a rotating synchronous motor 1 as a function of a rotor rotational speed v of the synchronous motor 1 at a fixed operating point of the synchronous motor 1. A first graph 17 shows here the amplitude A without a compensation of the spectral component of the differential detent torque, and a second graph 18 shows the amplitude A with a compensation of the spectral component of the differential detent torque. FIG. 7 shows that compensating the spectral component of the differential detent torque above a first rotational speed threshold value $v_S$ leads to a greater amplitude A than operating the synchronous motor 1 without compensation of the spectral component of the differential detent torque. This reflects the fact that the synchronous motor 1 generates voltage harmonics, which affect the current regulation as interference variables and prevent the amplitude and phase of the torque-generating current from being set correctly as the rotor rotational speed v increases. The compensation of a spectral component of the differential detent torque is therefore preferably switched off at rotor rotational speeds v above the first rotational speed threshold value $v_S$. The compensation of the no-load detent torque is switched off at rotor rotational speeds v above a second rotational speed threshold value. The second rotational speed threshold value is hereby generally greater than the first rotational speed threshold value $v_S$, i.e. the compensation of the no-load detent torque is switched off later (at higher rotor rotational speeds v) than the compensation of the spectral component of the differential detent torque.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for compensating detent torques of identically constructed synchronous motors, which each have a stator and a rotor, comprising:
    measuring on a reference motor of the identically constructed synchronous motors a no-load detent torque during no-load operation as a function of a rotor position of the rotor relative to the stator;
    measuring for various operating points of the reference motor a load detent torque as a function of the rotor position relative to the stator;
    subtracting for each measured load detent torque from the measured load detent torque the measured no-load detent torque to determine a differential detent torque for the reference motor;
    determining an operating-point-dependent spectral component of the differential detent torque;
    forming a model function of the spectral component, the model function modeling the spectral component as a function of the operating point; and
    superimposing for each synchronous motor of the identically constructed synchronous motors, during operation at an instantaneous operating point in a predetermined first operating range, on a setpoint current of the synchronous motor a first compensation current, which generates a compensation torque that compensates a detent torque at the instantaneous operating point with a value of the model function.

2. The method of claim 1, wherein the operating point of a synchronous motor is defined by an actual value of a load torque.

3. The method of claim 1, wherein the operating point of a synchronous motor is defined by an actual value of a load torque and at least one additional parameter.

4. The method of claim 1, wherein the model function models an amplitude of the spectral component of the differential detent torque by way of a polynomial function of a load torque.

5. The method of claim 1, wherein the model function models a phase of the spectral component of the differential detent torque by way of a piecewise linear function of a load torque.

6. The method of claim 1, further comprising:
    measuring for each synchronous motor the no-load detent torque in a no-load operation as a function of the rotor position relative to the stator, and
    superimposing, during operation of the synchronous motor in a predetermined second operating range, on the setpoint current of the synchronous motor a second compensation current which generates a compensation torque that compensates the no-load detent torque of the synchronous motor.

7. The method of claim 6, wherein the first operating range is contained within the second operating range.

8. The method of claim 6, wherein the first operating range and the second operating range are defined for a rotating synchronous motor by a rotational speed interval of a rotor rotational speed and for a linear synchronous motor by a velocity interval for rotor velocities.

9. The method of claim 6, wherein the spectral component of the differential detent torque is, for a rotating synchronous motor, a Fourier component of the differential detent torque as a function of a rotor angle of a rotation of the rotor relative to the stator and, for a linear synchronous motor, a Fourier component of the differential detent torque as a function of a rotor position of the rotor relative to the stator.

10. The method of claim 1, further comprising generating or changing a compensation current for compensating a detent torque, and changing the detent torque after a dead time after the generation or change of the compensation current has elapsed.

11. A compensation arrangement for compensating detent torques of identically constructed synchronous motors, which each have a stator and a rotor, comprising:
    a measuring device configured to acquire a no-load detent torque and a load detent torque of a reference motor as a function of a rotor position of the rotor relative to the stator,
    an evaluation unit configured to subtract for each measured load detent torque from the measured load detent torque the measured no-load detent torque to determine a differential detent torque for the reference motor, to determine an operating-point-dependent spectral component of the differential detent torque; and to form a model function of the spectral component, the model function modeling the spectral component as a function of the operating point; and
    a control unit associated with each of the identically constructed synchronous motors and configured to control a motor current of a synchronous motor and to superimpose, during operation of the synchronous motor at an instantaneous operating point in a first operating range, on a setpoint current of the synchronous motor a first compensation current, which generates a compensation torque that compensates a detent torque at the instantaneous operating point with a value of the model function.

12. The compensation arrangement of claim 11, wherein the control unit of the synchronous motor is configured to store a no-load detent torque of the synchronous motor as a function of the rotor position and to superimpose, during operation of the synchronous motor in a predetermined second operating range, on the setpoint current of the synchronous motor a second compensation current which generates a compensation torque which compensates the no-load detent torque of the synchronous motor which generates a compensation torque that compensates the no-load detent torque of the synchronous motor.

* * * * *